US010618364B2

(12) United States Patent
Meza et al.

(10) Patent No.: US 10,618,364 B2
(45) Date of Patent: Apr. 14, 2020

(54) HYBRID LEAF SPRING ARRANGEMENT FOR VEHICLE SUSPENSION SYSTEM

(71) Applicant: Rassini Suspensiones, S.A. de C.V., Del. Miguel Hidalgo (MX)

(72) Inventors: Jesus Ernesto Meza, Coahuila (MX); Jose G. Ruiz Juarez, Coahuila (MX); Anthony Berlingieri, Plymouth, MI (US); Ramón Diego-Guedea, Ann Arbor, MI (US); Alejandra Julieta Monsivais Barron, Troy, MI (US); Juan Jose Wong, Coahuila (MX); Sergio Guadalupe Castillon Martinez, Coahuila (MX); Jose Luis Mejia, Canton, MI (US)

(73) Assignee: Rassini Suspensiones, S.A. de C.V. (MX)

( * ) Notice: Subject to any disclaimer, the term of this patent is extended or adjusted under 35 U.S.C. 154(b) by 108 days.

(21) Appl. No.: 15/865,775

(22) Filed: Jan. 9, 2018

(65) Prior Publication Data
US 2018/0194185 A1  Jul. 12, 2018

Related U.S. Application Data

(60) Provisional application No. 62/444,006, filed on Jan. 9, 2017.

(51) Int. Cl.
*B60G 11/04* (2006.01)
*B60G 11/10* (2006.01)
*F16F 1/02* (2006.01)
*F16F 1/368* (2006.01)
*F16F 1/18* (2006.01)

(52) U.S. Cl.
CPC .............. *B60G 11/04* (2013.01); *B60G 11/10* (2013.01); *F16F 1/027* (2013.01); *F16F 1/182* (2013.01); *F16F 1/368* (2013.01); *B60G 2202/112* (2013.01); *B60G 2204/121* (2013.01); *B60G 2300/00* (2013.01); *F16F 2228/14* (2013.01)

(58) Field of Classification Search
CPC .. B60G 11/04; B60G 11/10; B60G 2204/121; B60G 2202/112; B60G 2300/00; F16F 1/027; F16F 1/00
See application file for complete search history.

(56) References Cited

U.S. PATENT DOCUMENTS 2,815,945 A * 12/1957 Green .................. B60G 11/02
                                                    267/45
2,861,798 A * 11/1958 Sidney ................. B60G 11/04
                                                    267/45
3,312,459 A *  4/1967 Pence .................... B60G 7/04
                                                    267/45

(Continued)

Primary Examiner — Drew J Brown

(57) ABSTRACT

A leaf spring vehicle suspension system includes a chassis rail. Also included is an axle. Further included is a first stage leaf spring operatively coupled at a first end and a second end to the chassis rail, the first stage leaf spring formed of a single steel spring plate and having a first length. Yet further included is a second stage leaf spring operatively coupled to the first stage leaf spring in a stacked arrangement proximate the axle, the second stage leaf spring formed of a composite material and having a second length that is less than the first length of the first stage leaf spring.

12 Claims, 2 Drawing Sheets

(56) References Cited

U.S. PATENT DOCUMENTS

| | | | | |
|---|---|---|---|---|
| 3,541,605 A * | 11/1970 | Mohl | ........................ | F16F 1/22 |
| | | | | 267/47 |
| 4,750,718 A * | 6/1988 | Nickel | ................... | B60G 11/40 |
| | | | | 267/149 |
| 5,507,516 A * | 4/1996 | Reast | ................... | B60G 11/125 |
| | | | | 267/231 |
| 5,938,221 A * | 8/1999 | Wilson | ................... | B60G 11/10 |
| | | | | 267/260 |
| 6,012,709 A * | 1/2000 | Meatto | ................... | B60G 11/04 |
| | | | | 267/36.1 |
| 8,505,942 B2 * | 8/2013 | Muck | ..................... | B60G 11/04 |
| | | | | 267/195 |
| 8,950,766 B2 * | 2/2015 | Schonen | ................ | B60G 11/02 |
| | | | | 280/124.17 |
| 2005/0077665 A1 * | 4/2005 | Platner | ................... | B60G 11/10 |
| | | | | 267/229 |
| 2006/0255556 A1 * | 11/2006 | Reast | ..................... | B60G 11/12 |
| | | | | 280/124.17 |
| 2007/0267836 A1 * | 11/2007 | Furman | ................. | B60G 9/003 |
| | | | | 280/124.17 |
| 2011/0001300 A1 * | 1/2011 | Juriga | ................... | B60G 11/113 |
| | | | | 280/124.116 |
| 2014/0035248 A1 * | 2/2014 | Dilworth | ............... | B60G 11/04 |
| | | | | 280/124.106 |
| 2015/0145187 A1 * | 5/2015 | Soles | ..................... | B60G 11/42 |
| | | | | 267/30 |
| 2018/0147904 A1 * | 5/2018 | Meza | ..................... | B62D 21/02 |
| 2018/0281541 A1 * | 10/2018 | Berlingieri | ............. | F16F 3/023 |
| 2019/0061455 A1 * | 2/2019 | Buchwitz | ............... | B60G 11/04 |
| 2019/0118600 A1 * | 4/2019 | Gerhards | ................ | B60G 9/02 |

* cited by examiner

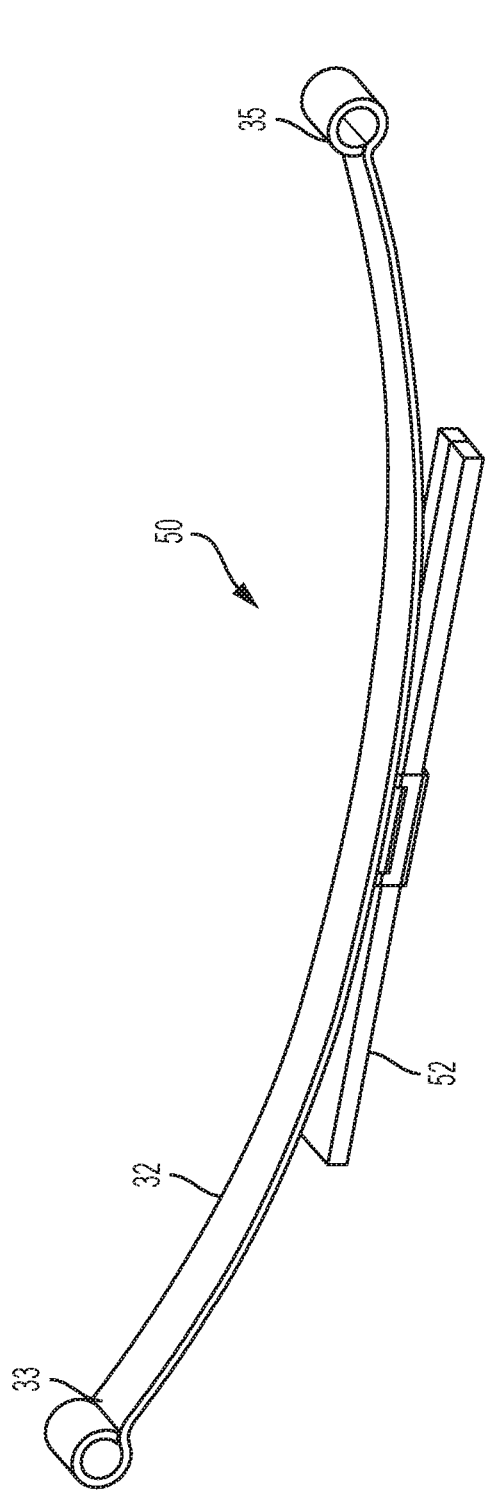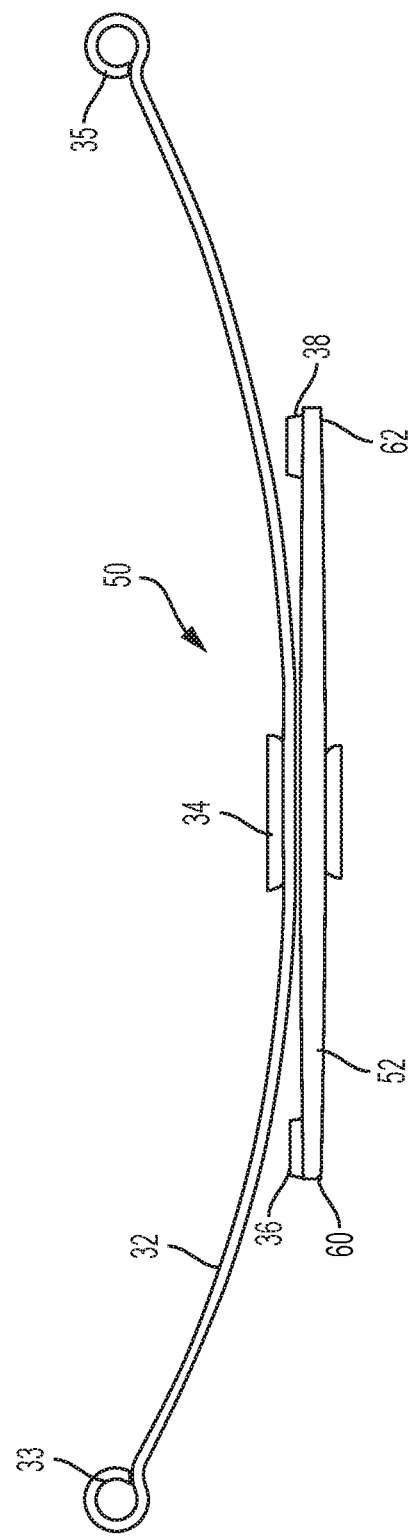

HYBRID LEAF SPRING ARRANGEMENT FOR VEHICLE SUSPENSION SYSTEM

CROSS-REFERENCE TO RELATED APPLICATIONS

This patent application claims priority to U.S. Provisional patent Application Ser. No. 62/444,006, filed Jan. 9, 2017, which is incorporated herein by reference in its entirety.

FIELD OF THE INVENTION

This invention relates generally to leaf spring suspension systems for vehicles.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

One effort to address the problems associated with other suspension systems employs a parallel leaf spring arrangement to provide a second stage spring rate of the system. Additionally, many assemblies have multiple spring plates that make up one or both of the stages. In today's marketplace, many vehicle manufacturers desire weight reduction to assist in fuel efficiency efforts. Unfortunately, the additional spring stage and multiple plates associated with one or both stages add weight to the overall assembly, and therefore the vehicle.

SUMMARY OF THE INVENTION

According to one embodiment, a leaf spring vehicle suspension system includes a chassis rail. Also included is an axle. Further included is a first stage leaf spring operatively coupled at a first end and a second end to the chassis rail, the first stage leaf spring formed of a single steel spring plate and having a first length. Yet further included is a second stage leaf spring operatively coupled to the first stage leaf spring in a stacked arrangement proximate the axle, the second stage leaf spring formed of a composite material and having a second length that is less than the first length of the first stage leaf spring.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a perspective view of a leaf spring arrangement of the vehicle suspension system; and FIG. 3 is a side, elevational view of the leaf spring arrangement of the vehicle suspension system.

DETAILED DESCRIPTION

Figure 1:
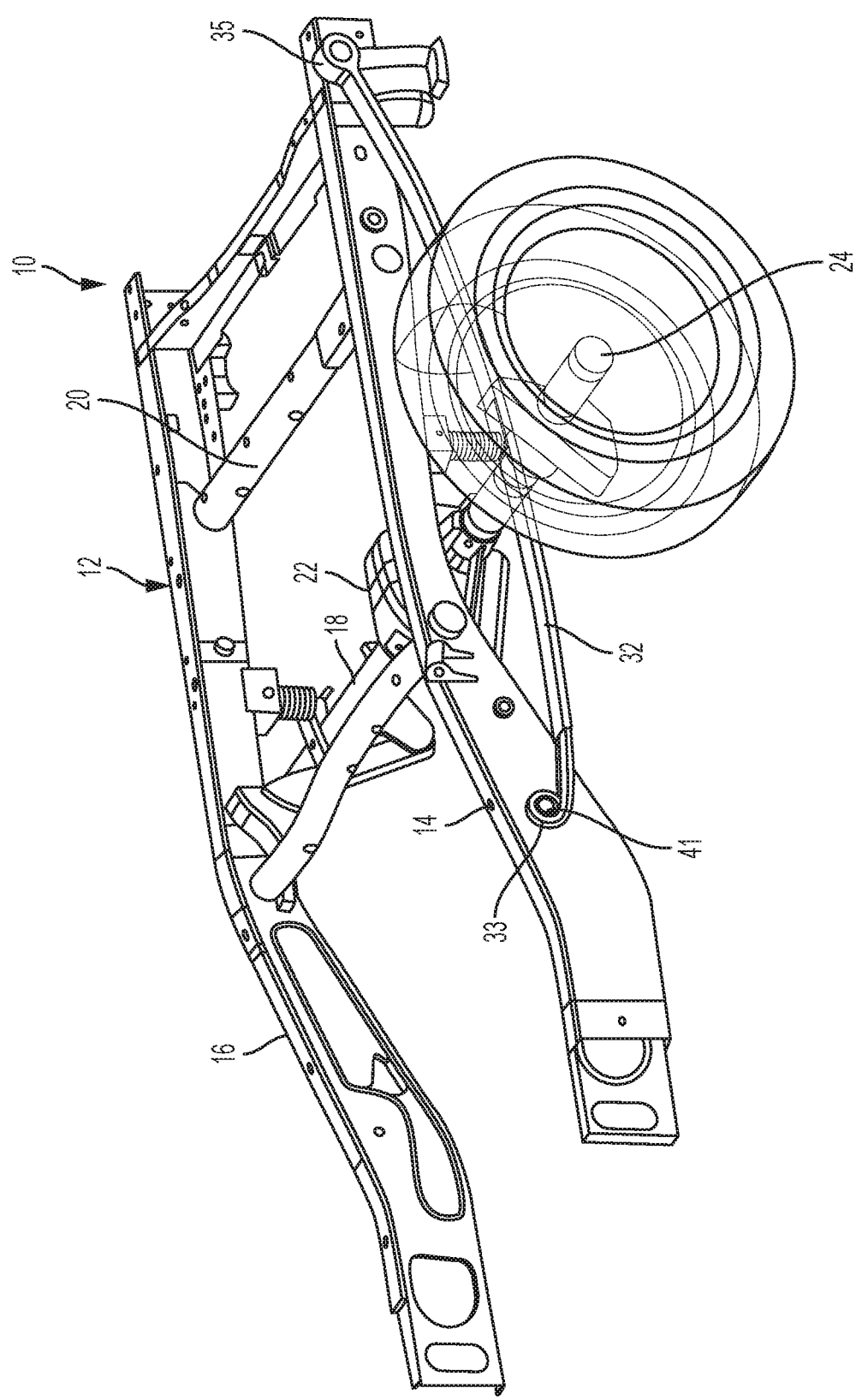
FIG. 1 is a perspective view of a vehicle suspension system.

Referring to FIG. 1, illustrated is a vehicle suspension system 10 having a chassis generally designated with numeral 12. The chassis 12 includes a first chassis rail 14 and a second chassis rail 16 that are arranged substantially parallel to each other. The first and second chassis rails 14, 16 are coupled to each another by at least one cross brace, such as a first cross brace 18 and a second cross brace 20, as shown. A differential drive arrangement 22 is fixedly coupled to the chassis 12 and converts the rotary motion of a drive shaft (not shown) to substantially orthogonal rotary motion at shaft 24 which may also be referred to as an axle. The shaft 24, also referred to as an axle herein, includes an associated pair of universal joints (not specifically designated) that are arranged to be proximal and distal with respect to the differential drive arrangement 22. Thus, the shaft 24 has an associated longitudinal axis to accommodate transaxial motion. It is to be appreciated that the shaft 24 refers to a pair of half shafts in some embodiments. The half shafts may be disposed within a single sleeve or uncovered.

A first stage leaf spring 32 is operatively coupled at a first end 33 and a second end 35 to the chassis rail 14. In particular, the first stage leaf spring 32 is coupled to the chassis rail 14 in a fixed manner with any suitable coupling element. In some embodiments, the first stage leaf spring 32 is operatively coupled, at least in part, to the chassis rail 14 with an eye spring bushing arrangement 41. For purposes of discussion, only first stage leaf spring 32 has been described in detail, but it is to be appreciated that a corresponding leaf spring is located on an opposing side of the chassis 12 proximate chassis rail 16.

Referring now to FIGS. 2 and 3, illustrated is a hybrid leaf spring arrangement 50 that includes the above-described first stage leaf spring 32. The hybrid leaf spring arrangement 50 includes leaf spring 32 and a second stage leaf spring 52, the leaf springs 32, 52 operatively coupled to each other proximate the shaft 24 of the suspension system. Disposed between the first end 33 and the second end 35 of the leaf spring 32 is a cage 34 (also referred to herein as a "clamping component") (FIG. 3) to operatively couple the first stage leaf spring 32 and the second stage leaf spring 52 to each other and to the shaft 24. In some embodiments, the cage 34 is located proximate a lengthwise midsection of the first stage leaf spring 32. In some embodiments, the cage 34 is centrally located at an exact lengthwise midsection of the first stage leaf spring 32.

The above-described first stage leaf spring 32 may be referred to as a "semi-elliptical" spring configured as an arc-shaped length segment. The first stage leaf spring 32 is formed of (i.e., consists of) a single steel spring plate. This contrasts with stacked spring plate arrangements. The single plate forming the first stage leaf spring 32 is lighter in comparison to such stacked arrangements, while maintaining desired rate characteristics associated with steel. Reducing weight is a significant benefit in many suspension systems, and many vehicles overall.

In some embodiments, the first stage leaf spring 32 is tapered by having a varying cross sectional area along a length thereof. For example, the thickness may vary along the leaf spring 32, with a maximum thickness being located proximate the stacked arrangement (e.g., cage 34).

The second stage leaf spring 52 is a single spring plate that is formed of a composite material to reduce the weight of the leaf spring 52 when compared to traditional steel spring plates. Employing a single plate rather than a stacked arrangement of second stage plates reduces the weight of the second stage. As described above, weight reduction is desirable in many applications. The weight of the second stage leaf spring 52 is further reduced by limiting the length of the second stage leaf spring 52 relative to the first stage leaf spring 32. In particular, the first stage leaf spring 32 has a first length and the second stage leaf spring 52 has a second length, with the second length being less than the first length. In some embodiments, the second length of leaf spring 52 is less than three-fourths (¾) of the first length of leaf spring 32. In other embodiments, the second length of leaf spring 52 is less than one-half (½) of the first length of leaf spring 32.

Traditional parabolic springs require a full length secondary station for stress balancing. In the embodiments described herein, a non-parabolic thickness profile is provided in the primary spring station, adding two thickness profiles in one. This allows a reduction in length, weight, cost and material on the secondary spring station and overall.

In some embodiments, the second stage leaf spring 52 has a varying cross sectional area along a length thereof. For example, the thickness may vary along the leaf spring 52, with a maximum thickness being located proximate the stacked arrangement (e.g., clamped section 34). By thickening one or both of the leaf springs proximate the stacked arrangement that is at or near the shaft 24, the lateral stiffness and windup stiffness of the suspension system is increased to levels that are desirable for certain suspension applications. Some embodiments include a varying width of the leaf spring 52.

The second stage leaf spring 52 is a plate, as described above. In some embodiments, a central plane extending in lengthwise and width-wise directions of the leaf spring 52 is flat and does not include curvature. In other words, although the varying thickness and/or width of the leaf spring 52 may include curvature, the second stage leaf spring 52 is formed of a substantially flat shape, in contrast to the curved first stage leaf spring 32.

As shown in FIG. 3, in some embodiments one or more bumpers may be provided to enhance variable spring rate characteristics of the hybrid leaf spring arrangement 50. For example, a first bumper 36 is located proximate a first end 60 of the second stage leaf spring 52. The first bumper 36 may be operatively coupled to, or integrally formed with, the leaf spring 52 itself. Similarly, a second bumper 38 is located proximate a second end 62 of the leaf spring 52. The second bumper 38 may be operatively coupled to, or integrally formed with, the leaf spring 52 itself. Each of the bumpers 36, 38 may be formed of any suitable material, including rubber, for example.

The bumpers 36, 38 are positioned on the leaf spring 52 to contact the first stage leaf spring 32 during certain deflections of one or both of the leaf springs 32, 52, in response to various movements of the vehicle, such as acceleration, braking, lateral movement due to turning maneuvers, movement due to changing road surfaces, etc.

Engagement of one or both of the bumpers 36, 38 with the first stage leaf spring 32 in response to spring deflection initiates a second spring rate of the hybrid leaf spring arrangement 50 to provide desirable spring characteristics that facilitate specified suspension dynamics. The precise location of the bumpers 36, 38 along the length of the leaf spring 52 may be adjusted to determine how much spring deflection is required before contact between the bumpers 36, 38 and the first stage leaf spring 32 occurs. Initiation of the second spring rate of the leaf spring 52 may be adjusted based on the location of the bumpers 36, 38. Such an arrangement provides flexibility of the spring response characteristics.

Contact between the bumpers 36, 38 and the first stage leaf spring 32 is permissible due to the non-parabolic shape of the leaf spring. Typically, steel parabolic leaf spring plates are not well-suited for such contact.

The embodiments described herein provide substantial weight reduction by employing a single spring plate for each stage of the arrangement and by using a shorter second stage spring (relative to the first stage spring) that is formed of a composite material. Additionally, the shorter second stage provides packaging advantages in some vehicles. For example, a full-length second stage (relative to the first stage) may inhibit tailpipe exit orientations, whereas the embodiments described herein avoid interference with such a component.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof

Having thus described the invention, it is claimed:

1. A leaf spring vehicle suspension system comprising:
a chassis rail;
an axle;
a first stage leaf spring operatively coupled at a first end and a second end to the chassis rail, the first stage leaf spring formed of a single steel spring plate and having a first length; and
a second stage leaf spring operatively coupled to the first stage leaf spring in a stacked arrangement proximate the axle, the second stage leaf spring formed of a composite material and having a second length that is less than the first length of the first stage leaf spring.

2. The leaf spring vehicle suspension system of claim 1, wherein the second length of the second stage leaf spring is less than ¾ the length of the first length of the first stage leaf spring.

3. The leaf spring vehicle suspension system of claim 1, wherein the second length of the second stage leaf spring is less than ½ the length of the first length of the first stage leaf spring.

4. The leaf spring vehicle suspension system of claim 1, wherein the second stage leaf spring is a single spring plate.

5. The leaf spring vehicle suspension system of claim 1, wherein the second stage leaf spring comprises a varying cross sectional area.

6. The leaf spring vehicle suspension system of claim 5, wherein the second stage leaf spring has a maximum thickness proximate the stacked arrangement proximate the axle.

7. The leaf spring vehicle suspension system of claim 1, wherein the first stage leaf spring comprises a varying cross sectional area.

8. The leaf spring vehicle suspension system of claim 7, wherein the first stage leaf spring has a maximum thickness proximate the stacked arrangement proximate the axle.

9. The leaf spring vehicle suspension system of claim 1, wherein the stacked arrangement comprises a clamping component that operatively couples the first stage leaf spring to the second stage leaf spring.

10. The leaf spring vehicle suspension system of claim 1, further comprising a first bumper operatively coupled to the second stage leaf spring, the first bumper spaced from the first stage leaf spring in a first condition to provide a first spring rate of the vehicle suspension system and in contact with the first stage leaf spring in a second condition, contact between the first bumper and the first stage leaf spring providing a second spring rate of the vehicle suspension system.

11. The leaf spring vehicle suspension system of claim 10, wherein the first bumper is located proximate one of a first end and a second end of the second stage leaf spring.

12. The leaf spring vehicle suspension system of claim 11, wherein the first bumper is located proximate the first end of the second stage leaf spring, the system further comprising a second bumper operatively coupled to the second stage leaf spring and located proximate the second end of the second stage leaf spring.

\* \* \* \* \*